(12) United States Patent
Takafuji

(10) Patent No.: US 9,399,738 B2
(45) Date of Patent: Jul. 26, 2016

(54) CIRCULATION TYPE GASIFICATION FURNACE

(71) Applicant: IHI Corporation, Tokyo (JP)

(72) Inventor: Makoto Takafuji, Tokyo (JP)

(73) Assignee: IHI CORPORATION (JP)

( * ) Notice: Subject to any disclaimer, the term of this patent is extended or adjusted under 35 U.S.C. 154(b) by 112 days.

(21) Appl. No.: 14/335,237

(22) Filed: Jul. 18, 2014

(65) Prior Publication Data

US 2014/0328730 A1 Nov. 6, 2014

Related U.S. Application Data

(63) Continuation of application No. PCT/JP2013/052274, filed on Jan. 31, 2013.

(30) Foreign Application Priority Data

Mar. 13, 2012 (JP) .................. 2012-055323

(51) Int. Cl.
*B01J 7/00* (2006.01)
*C10B 49/10* (2006.01)
*C10J 3/48* (2006.01)

(52) U.S. Cl.
CPC ............ *C10B 49/10* (2013.01); *C10J 3/482* (2013.01); *C10J 2300/093* (2013.01);
(Continued)

(58) Field of Classification Search
CPC ............ B01J 8/26; C10J 3/482; C10J 3/463
See application file for complete search history.

(56) References Cited

U.S. PATENT DOCUMENTS

| | | | | |
|---|---|---|---|---|
| 3,993,583 A | * | 11/1976 | Seglin ................ | C10J 3/54 252/373 |
| 2006/0150510 A1 | * | 7/2006 | Hiltunen ............ | C10J 3/482 48/210 |

(Continued)

FOREIGN PATENT DOCUMENTS

| CN | 101611123 A | 12/2009 |
|---|---|---|
| CN | 101880552 A | 11/2010 |

(Continued)

OTHER PUBLICATIONS

Chinese Office Action, dated Sep. 6, 2015, issued in corresponding Chinese Patent Application No. 201380012826.3. English translation. Total 14 pages.

(Continued)

*Primary Examiner* — Imran Akram
(74) *Attorney, Agent, or Firm* — Ostrolenk Faber LLP

(57) ABSTRACT

A circulation type gasification furnace is provided with: a gasification furnace that turns a fluidized medium into a fluidized bed or moving bed, and produces gasification gas by gasifying a gasification raw material injected into the fluidized medium; a combustion furnace that heats the fluidized medium discharged from the gasification furnace and combusts residue of the gasification raw material; a medium separator that, in order to return the fluidized medium to the gasification furnace, separates the fluidized medium from a combustion exhaust gas discharged from the combustion furnace; a gasification gas separator that separates the gasification gas produced in the gasification furnace from the residue of the gasification raw material; and a residue discharge section that creates a seal between the gasification gas separator and the combustion furnace, and discharges the residue separated by the gasification gas separator into the combustion furnace.

4 Claims, 2 Drawing Sheets

(52) U.S. Cl.
CPC . *C10J 2300/0916* (2013.01); *C10J 2300/0946* (2013.01); *C10J 2300/0976* (2013.01); *C10J 2300/0993* (2013.01); *C10J 2300/1637* (2013.01); *C10J 2300/1807* (2013.01); *Y02E 20/18* (2013.01)

(56) References Cited

U.S. PATENT DOCUMENTS

| | | | | |
|---|---|---|---|---|
| 2008/0250714 | A1* | 10/2008 | Palonen | C10J 3/482 48/197 FM |
| 2010/0018121 | A1* | 1/2010 | Murakami | C10J 3/463 48/62 R |
| 2010/0043683 | A1* | 2/2010 | Matsuzawa | C10J 3/482 110/229 |
| 2011/0107945 | A1* | 5/2011 | Suda | F23C 10/10 110/233 |
| 2011/0107946 | A1* | 5/2011 | Suda | F23C 10/10 110/341 |
| 2011/0120007 | A1* | 5/2011 | Matsuzawa | C10J 3/463 48/61 |
| 2011/0131881 | A1* | 6/2011 | Murakami | F23C 10/10 48/87 |
| 2011/0142721 | A1* | 6/2011 | Murakami | F23C 10/10 422/139 |
| 2012/0167462 | A1* | 7/2012 | Katagiri | F23C 10/28 48/78 |

FOREIGN PATENT DOCUMENTS

| | | |
|---|---|---|
| GB | 1 524 345 A | 9/1978 |
| JP | 52-117302 | 10/1977 |
| JP | 58-061181 | 4/1983 |
| JP | 2011-105890 | 6/2011 |
| KR | 10-2004-0001173 | 1/2004 |
| WO | WO 99/31202 A1 | 6/1999 |
| WO | WO 2010/004760 A1 | 1/2010 |

OTHER PUBLICATIONS

International Search Report and Written Opinion mailed Feb. 26, 2013 in corresponding PCT International Application No. PCT/JP2013/052274.

* cited by examiner

CIRCULATION TYPE GASIFICATION FURNACE

FIELD OF THE INVENTION

This application is a continuation application based on a PCT Patent Application No. PCT/JP2013/052274, filed Jan. 31, 2013, whose priority is claimed on Japanese Patent Application No. 2012-55323, filed Mar. 13, 2012. The contents of both the PCT Application and the Japanese Application are incorporated herein by reference.

BACKGROUND ART

In recent years technology has been developed that gasifies organic solid material such as coal, biomass, and tire chips instead of oil in order to produce gasification gas. The gasification gas that is produced in this manner is used in efficient power generation systems known as Integrated coal Gasification Combined Cycle (IGCC) systems, and in the manufacturing of hydrogen, the manufacturing of synthetic fuel (i.e., synthetic oil), and in the manufacturing of chemical products such as chemical fertilizers (i.e., urea) and the like. Of the organic solid materials that form the raw materials for this gasification gas, the ratio of reserves to production (R/PR) for coal is approximately 150 years, which is approximately three or more times the R/PR of oil, and coal deposits are more evenly distributed compared to oil. Therefore, coal is particularly expected to be a natural resource that is capable of providing a stable supply for a considerable time into the future.

Conventionally, the process of gasifying coal is achieved by performing partial oxidation using oxygen and air, however, because an extremely high temperature of approximately 1800° C. and an extremely high pressure of approximately 3 MPa are required in this gasification process, special materials that are able to withstand high temperatures and high pressures are required so that the conventional technology has the drawback that the costs of the gasification furnace are extremely expensive. In order to solve this problem, technology has been developed that utilizes steam in order to gasify coal at comparatively low temperatures of between approximately 700° C. to 900° C., and at normal pressure. This technology has the advantages that, by setting the temperature and pressure at lower levels, special structure to withstand high pressure is not required, and commercially available items already in common use can be employed.

However, in the above-described organic solid material steam gasification reaction, a comparatively long reaction time is required. Accordingly, a fluidized bed is formed in the gasification furnace by supplying a fluidized medium such as sand that has been heated to a high temperature of, for example, 800° C. or more, and by supplying steam from underneath the gasification furnace. As a result, an adequate residence time for the organic solid material to react sufficiently is ensured. Gasification gas is then produced by injecting gasification raw material into the gasification furnace in which the fluidized bed has been formed, and performing fluidized heating on this gasification raw material.

In a gasification furnace in which a fluidized bed has been formed in this manner, of the sand and organic solid raw material that forms the fluidized medium, the solid particles having a small particle diameter separate from the fluidized bed together with the gasification gas and are scattered. In order to collect these scattered particles a gasification gas separator (i.e., a cyclone) that separates the gasification gas from the solid particles is installed in the discharge port of the gasification furnace. The solid particles collected by the gasification gas separator can then be returned to the gasification furnace (see, for example, Patent document 1).

RELATED ART DOCUMENTS

Patent Documents

[Patent Document 1] Japanese Unexamined Patent Application, First Publication No. 2011-105890

DISCLOSURE OF THE INVENTION

Problems to be Solved by the Invention

Although, as is described above, the solid particles are temporarily collected by the gasification gas separator and returned to the gasification furnace, the solid particles are once again scattered together with newly generated solid particles in the gasification furnace and are again separated by the gasification gas separator. This cycle is continuously repeated. The diameter of the solid particles becomes steadily smaller so that these solid particles can no longer be collected by the gasification gas separator. Consequently, they travel together with the gasification gas to a subsequent gas purifier, and there is a possibility that they will generate failures in the gas purifier.

Moreover, when the solid particles collected by the gasification gas separator are being returned to the gasification furnace, if they are not carefully regulated, there is a possibility that the solid particles discharged from the gasification gas separator will backflow into the gasification gas separator, and it is quite probable that this will generate failures in the gasification gas separator.

The present invention was conceived in view of the above-described circumstances, and it is an object thereof to provide a circulation type gasification furnace that suppresses the repeated scattering of solid particles inside a gasification furnace while maintaining the utilization efficiency of the gasification raw material, and that makes it possible to properly discharge gasification gas from a gasification gas separator.

Means for Solving the Problem

In order to solve the above-described problems, a circulation type gasification furnace according to the present invention is provided with: a gasification furnace that turns a fluidized medium into a fluidized bed or moving bed, and produces gasification gas by gasifying a gasification raw material that has been injected into the fluidized medium using heat from the fluidized medium; a combustion furnace that heats the fluidized medium discharged from the gasification furnace and combusts residue of the gasification raw material; a medium separator that, in order to return the heated fluidized medium to the gasification furnace, separates the fluidized medium and a combustion exhaust gas from each other, the fluidized medium and the combustion exhaust gas being discharged from the combustion furnace; a gasification gas separator that separates the gasification gas produced in the gasification furnace and the residue of the gasification raw material from each other, and then discharges the gasification gas; and a residue discharge section that creates a seal between the gasification gas separator and the combustion furnace, and discharges the residue separated by the gasification gas separator into the combustion furnace.

The residue discharge section may be formed by a loop seal that forms a seal between two gases by interposing a liquid or a solid between them.

The residue discharge section may be formed by a screw feeder that rotates a spiral-shaped screw so as to feed the residue of the gasification raw material in the direction of the axis of rotation.

Effects of the Invention

According to the present invention, it is possible to suppress the repeated scattering of solid particles inside a gasification furnace, while maintaining the utilization efficiency of the gasification raw material, and to thereby properly discharge gasification gas from a gasification gas separator.

EMBODIMENTS FOR CARRYING OUT THE INVENTION

A preferred embodiment of the present invention will now be described in detail with reference made to the appended drawings. Note that dimensions, materials, and other specific numerical values and the like that are depicted in the following embodiment are simply examples intended to facilitate an understanding of the present invention and, unless otherwise stated, are in no way limiting of the present invention. Note also that elements having essentially the same functions and structure in the present specification and drawings are given the same descriptive symbols and any duplicated description thereof is omitted. Furthermore, any elements that have no direct relationship to the present invention have been omitted from the drawings.

(Circulating Fluidized Bed Gasification Furnace 100)

Figure 1:
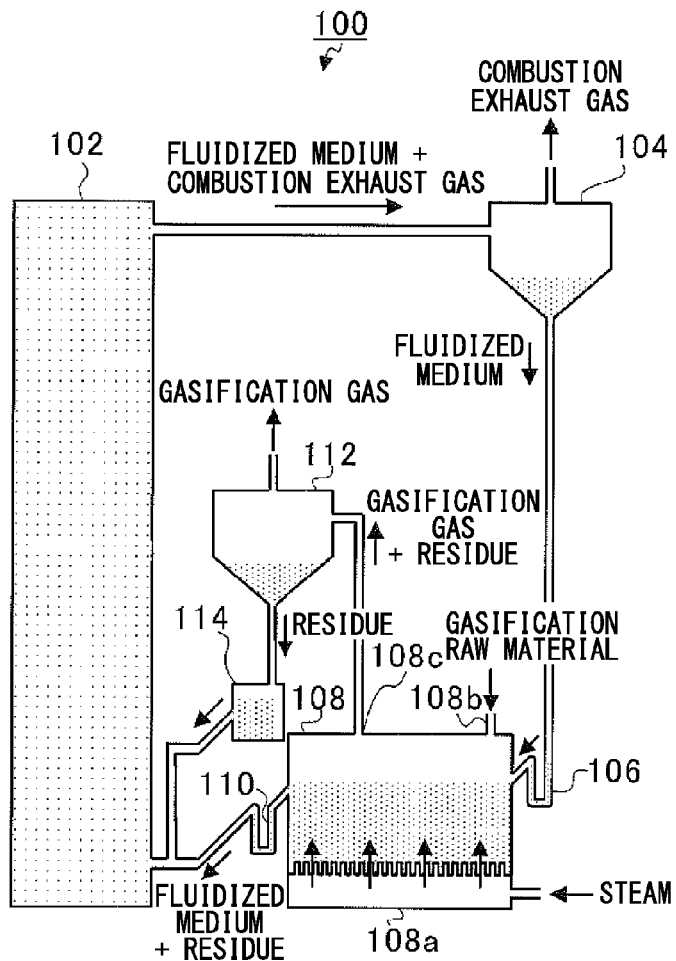
FIG. 1 is a view illustrating the schematic structure of a circulation type gasification furnace.

FIG. 1 is a view illustrating the schematic structure of a circulating fluidized bed gasification furnace 100. In the present embodiment, the circulating fluidized bed gasification furnace 100 is described as an example of a circulation type gasification furnace. As is shown in FIG. 1, the circulating fluidized bed gasification furnace 100 is constructed so as to include a combustion furnace 102, a medium separator 104, a first sealing section 106, a gasification furnace 108, a second sealing section 110, a gasification gas separator 112, and a residue discharge section 114.

(Circulation of Fluidized Medium)

Throughout the circulating fluidized bed gasification furnace 100, a fluidized medium that is formed by sand such as quartz sand (i.e., silica sand) having a grain diameter of approximately 300 μm is circulated as the thermal catalyst. In the circulation of the fluidized medium, firstly, the fluidized medium is heated in the combustion furnace 102 to approximately 1000° C., and is then introduced together with the combustion exhaust gas into the medium separator 104. In the medium separator 104, the high-temperature fluidized medium and the combustion exhaust gas are separated from each other, and the separated high-temperature fluidized medium is discharged (i.e., returned) to the gasification furnace 108 via the first sealing section 106. On the other hand, the combustion exhaust gas that was separated out in the medium separator 104 undergoes thermal recovery by means of a boiler or the like (not shown).

A steam storage section 108a is provided underneath the gasification furnace 108, and steam that is supplied from a steam supply source (not shown) is temporarily stored in the steam storage section 108a. The steam stored in the steam storage section 108a is introduced into the interior of the gasification furnace 108 through a bottom portion of the gasification furnace 108. The high-temperature fluidized medium that has been introduced through the first sealing section 106 then receives a further input of steam so that a fluidized bed is formed inside the gasification furnace 108. Once the fluidized medium has fulfilled its role as a fluidized bed, it is returned together with the gasification raw material residue to the combustion furnace 102 via the second sealing section 110.

(Processing to Produce Gasification Gas)

Next, a gasification gas production processing flow will be described. A gasification raw material injection port 108b is provided in the gasification furnace 108. Gasification raw material that includes an organic solid material such as a coal such as lignite, petroleum coke, biomass, tire chips, or the like is injected into the above-described fluidized bed through the gasification raw material injection port 108b. The injected gasification raw material is gasified by the steam and by the heat of approximately 700° C. to 900° C. provided by the fluidized medium that has been formed into a fluidized bed and, as a result, gasification gas is produced. If the gasification raw material is coal, then gasification gas whose principal components are hydrogen, carbon monoxide, carbon dioxide, and methane is produced.

The gasification gas produced in this manner is introduced together with the residue of the gasification raw material (i.e., the solid particles) into the gasification gas separator 112 via a gasification gas discharge port 108c. In the gasification gas separator 112, the gasification gas and the gasification raw material residue are separated from each other, and the separated gasification gas is discharged to a gas purifier (not shown). In this way, the gasification gas produced in the gasification furnace 108 is properly forwarded to the gas purifier.

Moreover, the residue of the gasification raw material that was separated out in the gasification gas separator 112 is discharged directly to the combustion furnace 102 via the residue discharge section 114 without being returned to the gasification furnace 108. Hereinafter, the characteristic gasification gas separator 112 and residue discharge section 114 of the present embodiment will be described in detail.

(Gasification Gas Separator 112)

As is described above, in the gasification gas separator 112, after the gasification gas and the gasification raw material residue have been separated, the gasification raw material residue is discharged directly to the combustion furnace 102 instead of being returned to the gasification furnace 108. The reasons for this will now be described.

Figure 2:
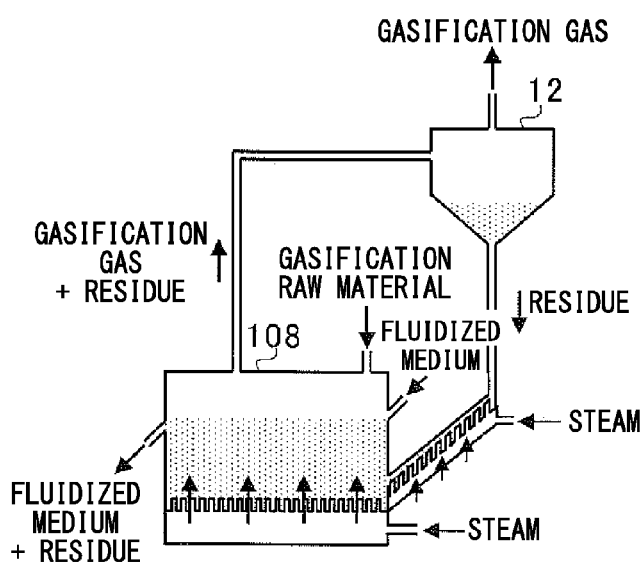
FIG. 2 is a view showing a comparative example of the present embodiment.

FIG. 2 is a view showing a comparative example of the present embodiment. In a conventional gasification gas separator 12, the separated gasification raw material residue, which has a small particle diameter, is returned without change to the fluidized bed of the gasification furnace 108. Accordingly, although the gasification raw material residue undergoes a gasification reaction once again in the fluidized bed, the ungasified solid particles scatter inside the gasification furnace 108 and are then returned to the gasification gas separator 12 as gasification raw material residue. This sequence occurs repeatedly.

The amount of this gasification raw material residue having a small particle diameter increases as more gasification raw material is injected into the gasification furnace. The diameter of the gasification raw material residue becomes gradually smaller so that it cannot be collected in the gasification gas separator 12, and there is a possibility that, together with the gasification gas, they will reach the subsequent gas purifier and may cause failures in the gas purifier and the like to occur.

Moreover, when the gasification raw material residue collected in the conventional gasification gas separator 12 is returned to the gasification furnace 108, in order to cause the gasification raw material to undergo a gasification reaction, the residue is discharged into the fluidized bed (i.e., a fluidized medium) of the gasification furnace 108. However, because a pressure difference exists between the gasification gas separator 12 and the fluidized bed of the gasification furnace 108, in order to discharge the gasification raw material residue to the fluidized bed of the gasification furnace 108, a separate fluidized bed that is formed by an inert gas such as steam or the like is created.

In this fluidized bed that is used to discharge gasification raw material, it is necessary to quicken the flow rate in order to properly discharge the gasification raw material residue to the fluidized bed of the high-pressure gasification furnace 108. However, if the flow rate of the fluidized bed is quickened too much even when the residue has a small particle diameter, then the solid particles are blown upwards as the steam is introduced, and they may even backflow into the gasification gas separator 12. Because it is not possible for the diameter of the solid particles to be measured while the gasification furnace is in operation, and the flow rate of the fluidized bed is calculated based on an estimated value for the particle diameter, it is difficult to completely prevent this type of backflow of the solid particles.

In the present embodiment, as is shown in FIG. 1, after the gasification gas separator 112 has separated the gasification gas from the gasification raw material residue, because the gasification raw material residue is discharged directly to the combustion furnace 102 instead of being returned to the gasification furnace 108, gasification raw material residue that has already been discharged once is sufficiently combusted by the combustion furnace 102. Accordingly, essentially none of the gasification raw material residue that was separated out by the gasification gas separator 112 is returned to the gasification gas separator 112. Moreover, when the gasification raw material residue is being discharged to the combustion furnace 102, it is not necessary for the rate of this discharge to be speeded up. As a consequence, there are no concerns about backflow even when a fluidized bed has been formed.

It should be noted that as a result of the gasification raw material residue not being returned to the gasification furnace 108, the gasification raw material residue that is conventionally used for a gasification reaction in the gasification furnace 108 is extracted from the gasification furnace 108, and the utilization efficiency inside the gasification raw material gasification furnace 108 deteriorates. However, in the present embodiment, this gasification raw material is used as a fuel source to heat the fluidized medium inside the combustion furnace 102, and indirectly serves as an energy source for the gasification reaction. As a result, residue that, hitherto, was scattered and unusable can now be used as a heat source in the combustion furnace 102. Because of this, the overall utilization efficiency can be increased.

(Residue Discharge Section 114)

Figure 3A:
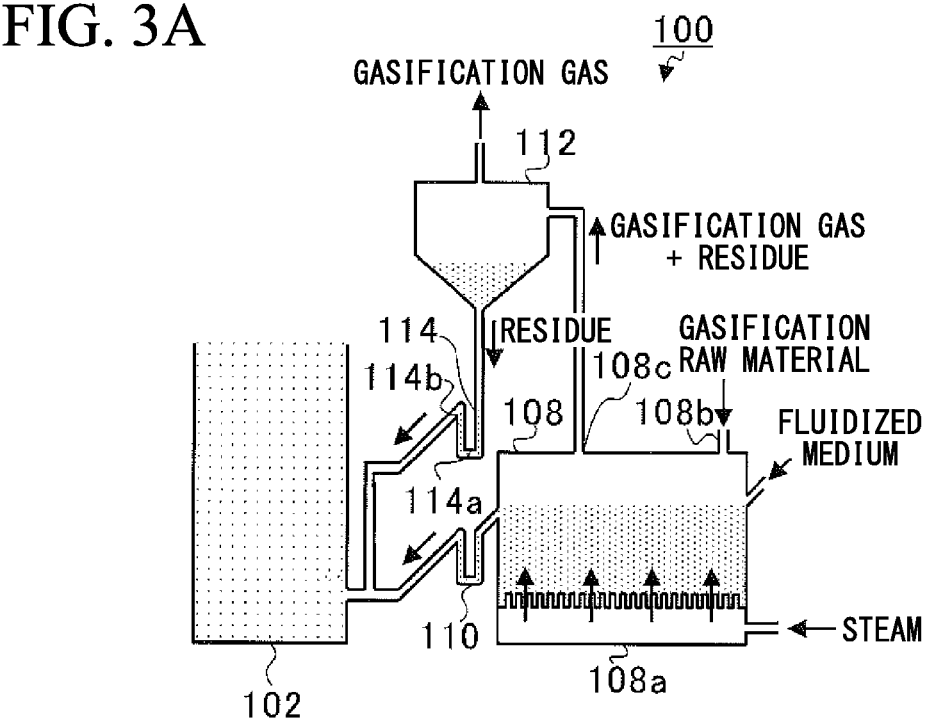
FIG. 3A is a view illustrating a residue discharge section.
Figure 3B:
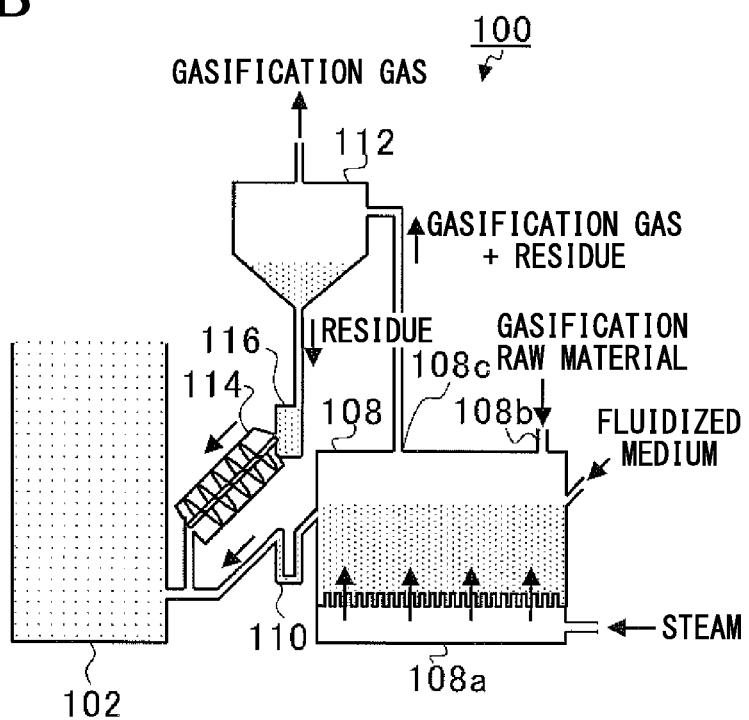
FIG. 3B is a view illustrating a residue discharge section.

FIG. 3A and FIG. 3B are views illustrating the residue discharge section 114. When gasification raw material residue is discharged from the gasification gas separator 112 to the combustion furnace 102, if it is simply discharged through a pipe, because the air pressure inside the combustion chamber 102 is higher than that inside the gasification gas separator 112, there is a possibility that the gasification raw material residue together with the fluidized medium and the like inside the combustion chamber 102 will backflow into the gasification gas separator 112. Moreover, simply ventilating the inflammable gasification gas inside the gasification gas separator 112 together with the air inside the combustion furnace 102 just as they are may be dangerous. Therefore, in the present embodiment, as is shown in FIG. 3A, the residue discharge section 114 that seals the gasification gas separator 112 from the combustion furnace 102 is provided on the pipe between the gasification gas separator 112 and the combustion furnace 102.

As is shown in FIG. 3A, in the same way as, for example, the first sealing section 106 and the second sealing section 110, the residue discharge section 114 is formed by a J-valve tubing loop seal in which the tubing is formed in a J shape. A loop seal forms a seal between two gases by interposing a liquid or a solid between them. In the residue discharge section 114, as is shown in FIG. 3A, because a vertical topmost portion 114a of the concave portion of the concave-shaped flow path is lower than a vertical bottommost portion 114b of the other portions of the flow path, the residue normally accumulates in this concave portion of the flow path. Accordingly, the space inside the flow path is divided into segments by this residue, so that the combustion furnace 102 can be prevented from communicating with the gasification gas separator 112. As a result of this, the residue can be appropriately discharged to the combustion furnace 102.

The residue discharge section 114 is not limited to the above-described loop seal and, as is shown in FIG. 3B, it is also possible to use a screw feeder or the like. A screw feeder rotates a spiral-shaped screw so as to feed the gasification raw material residue in the direction of the axis of rotation. At this time, the residue that fills the screw feeder functions as a material seal. Here, in the gasification gas separator 112, the gasification raw material residue that has been separated from the gasification gas is temporarily held by gravity in a vessel 116, and this residue is discharged to the combustion furnace 102 each time by the screw feeder. A seal is formed between the gasification gas separator 112 and the combustion furnace 102 by this screw feeder as well, so that the combustion furnace 102 can be prevented from communicating with the gasification gas separator 112. As a result of this, the residue can be appropriately discharged to the combustion furnace 102.

According to the above-described circulating fluidized bed gasification furnace 100 which is serving as a circulation type gasification furnace, by using the gasification raw material as a heat source in the combustion furnace 102 instead of extracting it from the gasification furnace 108, it is possible, while maintaining the utilization efficiency, to suppress the repeated scattering of solid particles inside the gasification furnace 108, and to thereby properly discharge the gasification gas in the gasification gas separator 112. In this manner, the quantity of gasification raw material residue that reaches the gas purifier downstream from the gasification gas separator 112 can be substantially decreased, and it is possible to avoid the problems caused by particle blockages and the like inside the gas purifier.

Hereinabove, while the exemplary embodiments of the present invention have been described with reference to the accompanying drawings, it is needless to say that the present invention is not limited thereto. It will be apparent to those skilled in the art that various modifications and variations may be made without departing from the spirit of the following claims and will fall into the technical scope of the present invention.

For example, in the above-described embodiment, the circulating fluidized bed gasification furnace 100 that fluidizes a fluidized medium in the form of sand in a horizontal direction is described as an example of a circulation type gasification furnace, however, it is also possible to use a circulating moving bed gasification furnace in which a moving bed is formed as a result of sand flowing vertically downwards due to its own weight.

INDUSTRIAL APPLICABILITY

The present invention relates to a circulation type gasification furnace that circulates a fluidized medium so as to gasify a gasification raw material.

DESCRIPTION OF THE REFERENCE NUMERALS

100 CIRCULATING FLUIDIZED BED GASIFICATION FURNACE
102 COMBUSTION FURNACE
104 MEDIUM SEPARATOR
108 GASIFICATION FURNACE
112 GASIFICATION GAS SEPARATOR
114 RESIDUE DISCHARGE SECTION

What is claimed is:

1. A circulation type gasification furnace comprising:
a gasification furnace that is configured to turn a fluidized medium into a fluidized bed or moving bed, and to produce gasification gas by gasifying a gasification raw material that has been injected into the fluidized medium using heat from the fluidized medium;
a combustion furnace that is configured to heat the fluidized medium discharged from the gasification furnace and to combust residue of the gasification raw material;
a medium separator that is configured, in order to return the heated fluidized medium to the gasification furnace, to separate the fluidized medium and a combustion exhaust gas from each other, the fluidized medium and the combustion exhaust gas being discharged from the combustion furnace;
a gasification gas separator that is configured to separate the gasification gas produced in the gasification furnace and the residue of the gasification raw material from each other, and then to discharge the gasification gas; and
a residue discharge section that is configured to create a seal between the gasification gas separator and the combustion furnace, and to discharge the residue separated by the gasification gas separator into the combustion furnace,
wherein:
the combustion furnace is connected to the medium separator, and the fluidized medium and the combustion exhaust gas are discharged from the combustion furnace to the medium separator;
the medium separator is connected to the gasification furnace, and the fluidized medium is discharged from the medium separator to the gasification furnace;
as a first path, the gasification furnace is connected to the combustion furnace, and the fluidized medium is discharged from the gasification furnace to the combustion furnace; and
as a second path that is different from the first path, the gasification furnace is connected to the gasification gas separator, the gasification gas separator is connected to the residue discharge section, the residue discharge section is connected to the combustion furnace, the gasification gas and the residue of the gasification raw material are introduced from the gasification furnace into the gasification gas separator, and the residue of the gasification raw material separated in the gasification gas separator is discharged to the combustion furnace via the residue discharge section.

2. The circulation type gasification furnace according to claim 1, wherein the residue discharge section is formed by a loop seal that is configured to form a seal between two gases by interposing a liquid or a solid between them.

3. The circulation type gasification furnace according to claim 1, wherein the residue discharge section is formed by a screw feeder that is configured to rotate a spiral-shaped screw so as to feed the residue of the gasification raw material in the direction of the axis of rotation.

4. The circulation type gasification furnace according to claim 3, wherein in the screw feeder, the residue of the gasification raw material that fills the screw feeder functions as a material seal so as to create the seal between the gasification gas separator and the combustion furnace.

* * * * *